United States Patent
Roundy et al.

(10) Patent No.: US 9,225,736 B1
(45) Date of Patent: Dec. 29, 2015

(54) TECHNIQUES FOR DETECTING ANOMALOUS NETWORK TRAFFIC

(71) Applicant: Symantec Corporation, Mountain View, CA (US)

(72) Inventors: Kevin Alejandro Roundy, El Segundo, CA (US); Jie Fu, Chengdu (CN); Tao Cheng, Zigong (CN); Zhi Kai Li, Zigong (CN); Fanglu Guo, Mountain View, CA (US); Sandeep Bhatkar, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/929,123

(22) Filed: Jun. 27, 2013

(51) Int. Cl.
G06F 11/00 (2006.01)
H04L 29/06 (2006.01)

(52) U.S. Cl.
CPC .................................. *H04L 63/1425* (2013.01)

(58) Field of Classification Search
USPC ...................................................... 726/22–26
See application file for complete search history.

(56) References Cited

U.S. PATENT DOCUMENTS

| | | | | |
|---|---|---|---|---|
| 2005/0273857 A1* | 12/2005 | Freund | ................ | H04L 63/1416 726/23 |
| 2010/0154032 A1* | 6/2010 | Ollmann | ............... | G06F 21/552 726/3 |
| 2010/0251329 A1* | 9/2010 | Wei | ..................... | H04L 63/1408 726/1 |
| 2012/0240236 A1* | 9/2012 | Wyatt | ..................... | G06F 21/564 726/25 |
| 2012/0278851 A1* | 11/2012 | Dan | ..................... | H04L 41/0893 726/1 |
| 2013/0031601 A1* | 1/2013 | Bott | ....................... | G06F 21/552 726/1 |
| 2013/0312102 A1* | 11/2013 | Brake | ................. | H04L 63/1433 726/25 |
| 2014/0036697 A1* | 2/2014 | Annan | ................... | H04L 67/22 370/252 |
| 2014/0128047 A1* | 5/2014 | Edwards | ................ | H04L 51/12 455/415 |

OTHER PUBLICATIONS

Saldana et al. "Emerging real-time services: optimizing traffic by smart cooperation in the network," Communications Magazine, IEEE Year: 2013, vol. 51, Issue: 11, pp. 127-136.*
Li et al., "VoIP Traffic Identification Based on Host and Flow Behavior Analysis," Wireless Communications Networking and Mobile Computing (WiCOM), 2010 6th International Conference on 2010 pp. 1-4.*

* cited by examiner

*Primary Examiner* — Roderick Tolentino
(74) *Attorney, Agent, or Firm* — Wilmer Cutler Pickering Hale and Dorr LLP

(57) ABSTRACT

Techniques for detecting anomalous network traffic are disclosed. In one particular embodiment, the techniques may be realized as a method for detecting anomalous network traffic comprising the steps of receiving a list including a plurality of processes and, for each process, a list of approved types of network traffic; monitoring network traffic of each process on the list of processes; upon detecting network traffic for a process on the list of processes, determining that the type of network traffic detected is not on the list of approved types for that process; and identifying the process as infected based on determining that the type of network traffic detected is not on the list of approved types for that process.

12 Claims, 6 Drawing Sheets

TECHNIQUES FOR DETECTING ANOMALOUS NETWORK TRAFFIC

FIELD OF THE DISCLOSURE

The present disclosure relates generally to computer security and, more particularly, to techniques for detecting anomalous network traffic.

BACKGROUND OF THE DISCLOSURE

There are particular files that are common to many computer systems and therefore are often the target of malicious code. This malicious code, or malware, may propagate on a user's system through a variety of means. For example, malware may inject copies of itself into computer files or into the memory buffers in a running process, or may add a library to the memory of a running process which can then be used to further infect the system and other networked systems. While computer security services make every effort to identify and respond to threats as they appear, new threats that have not yet been identified are a constant danger to computer systems.

Automated tools have been developed for detecting anomalous behavior on a network that may indicate malicious code activity on the network. For instance, a significant quantity of network traffic that exceeds the expected amount of traffic may be used to identify unauthorized communications from infected files. Some newer malware is designed to communicate only intermittently and in amounts characteristic of normal traffic in order to be more difficult to detect by these tools.

In view of the foregoing, it may be understood that there may be significant problems and shortcomings associated with current data security technologies.

SUMMARY OF THE DISCLOSURE

Techniques for detecting anomalous network traffic are disclosed. In one particular embodiment, the techniques may be realized as a method for detecting anomalous network traffic comprising the steps of receiving a list including a plurality of processes and, for each process, a list of approved types of network traffic; monitoring network traffic of each process on the list of processes; upon detecting network traffic for a process on the list of processes, determining that the type of network traffic detected is not on the list of approved types for that process; and identifying the process as infected based on determining that the type of network traffic detected is not on the list of approved types for that process.

In accordance with other aspects of this particular embodiment, each approved type of network traffic may be associated with one or more network communication protocols.

In accordance with other aspects of this particular embodiment, at least one of the processes may have a list of approved types that consists of no approved types, such that any network traffic detected for that process will not be on the list of approved types for that process.

In accordance with other aspects of this particular embodiment, the method may further comprise blocking the detected network traffic that is not on the list of approved types for that process.

In accordance with other aspects of this particular embodiment, the list of processes with the lists of approved types of network traffic for each processes may be generated by a method of dynamic analysis comprising the steps of monitoring the network traffic of each process on the list of processes; and, for each process on the list, generating a list of approved types of network traffic based on types of the network traffic detected for the process while monitoring the network traffic of the process.

In accordance with other aspects of this particular embodiment, the list of processes with the lists of approved types of network traffic for each processes may be generated by a method of static analysis comprising the steps of, for each process on the list, analyzing a file representing the process to determine what types of network traffic are used by the process; and, for each process on the list, generating a list of approved types of network traffic based on types of network traffic determined for the process while analyzing the file representing the process.

In accordance with other aspects of this particular embodiment, the techniques may be realized as at least one non-transitory processor readable storage medium storing a computer program of instructions configured to be readable by at least one processor for instructing the at least one processor to execute a computer process for performing a method of one of the embodiments.

In another particular embodiment, the techniques may be realized as a method of dynamic analysis comprising the steps of receiving a list including a plurality of processes; monitoring the network traffic of each process on the list of processes; for each process on the list, generating a list of approved types of network traffic based on types of the network traffic detected for the process while monitoring the network traffic of the process; and transmitting the list of processes including, for each process, the list of approved types of network traffic for use in identifying infected processes.

In accordance with other aspects of this particular embodiment, the monitored processes may be exemplary processes that are known not to be infected by malicious code.

In accordance with further aspects of this particular embodiment, for each process, the network traffic for multiple instances of the process running on different computer systems may be monitored.

In accordance with further aspects of this particular embodiment, generating a list of approved types may further comprise, for at least one of the processes on the list, including fewer than all of the types of network traffic detected for instances of that process on the list of approved types for that process.

In accordance with further aspects of this particular embodiment, the fewer than all types of network traffic that are included on the list of approved types may be based on determining how many processes generated each type of network traffic, and identifying types of network traffic that failed to appear on at least a certain threshold quantity of the instances of the process as not typical types of network traffic for the listed process.

In accordance with other aspects of this particular embodiment, the list may be used in a method for detecting anomalous network traffic comprising the steps of receiving the list including the plurality of processes and, for each process, the list of approved types of network traffic; monitoring network traffic of each process on the list of processes; upon detecting network traffic for a process on the list of processes, determining that the type of network traffic detected is not on the list of approved types for that process; and identifying the process as infected based on determining that the type of network traffic detected is not on the list of approved types for that process.

In accordance with other aspects of this particular embodiment, the techniques may be realized as at least one non-transitory processor readable storage medium storing a computer program of instructions configured to be readable by at least one processor for instructing the at least one processor to execute a computer process for performing a method of one of the embodiments.

In another particular embodiment, the techniques may be realized as a method for managing authentication information comprising the steps of receiving a list including a plurality of processes; for each process on the list, analyzing a file representing the process to determine what types of network traffic are used by the process; for each process on the list, generating a list of approved types of network traffic based on types of network traffic determined for the process while analyzing the file representing the process; and transmitting the list of processes including, for each process, the list of approved types of network traffic for use in identifying infected processes.

In accordance with other aspects of this particular embodiment, for each process on the list, analyzing the file may comprise identifying any libraries included by the process that include functions facilitating the generation of network traffic.

In accordance with further aspects of this particular embodiment, for at least one process on the list, analyzing the file may further comprise identifying one or more functions called by the process that facilitate the generation of network traffic.

In accordance with further aspects of this particular embodiment, for the at least one process on the list, generating the list of approved types of network traffic may comprise identifying those types of network traffic facilitated by the identified functions.

In accordance with further aspects of this particular embodiment, the list may be used in a method for detecting anomalous network traffic comprising the steps of receiving the list including the plurality of processes and, for each process, the list of approved types of network traffic; monitoring network traffic of each process on the list of processes; upon detecting network traffic for a process on the list of processes, determining that the type of network traffic detected is not on the list of approved types for that process; and identifying the process as infected based on determining that the type of network traffic detected is not on the list of approved types for that process.

In accordance with other aspects of this particular embodiment, the techniques may be realized as at least one non-transitory processor readable storage medium storing a computer program of instructions configured to be readable by at least one processor for instructing the at least one processor to execute a computer process for performing a method of one of the embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
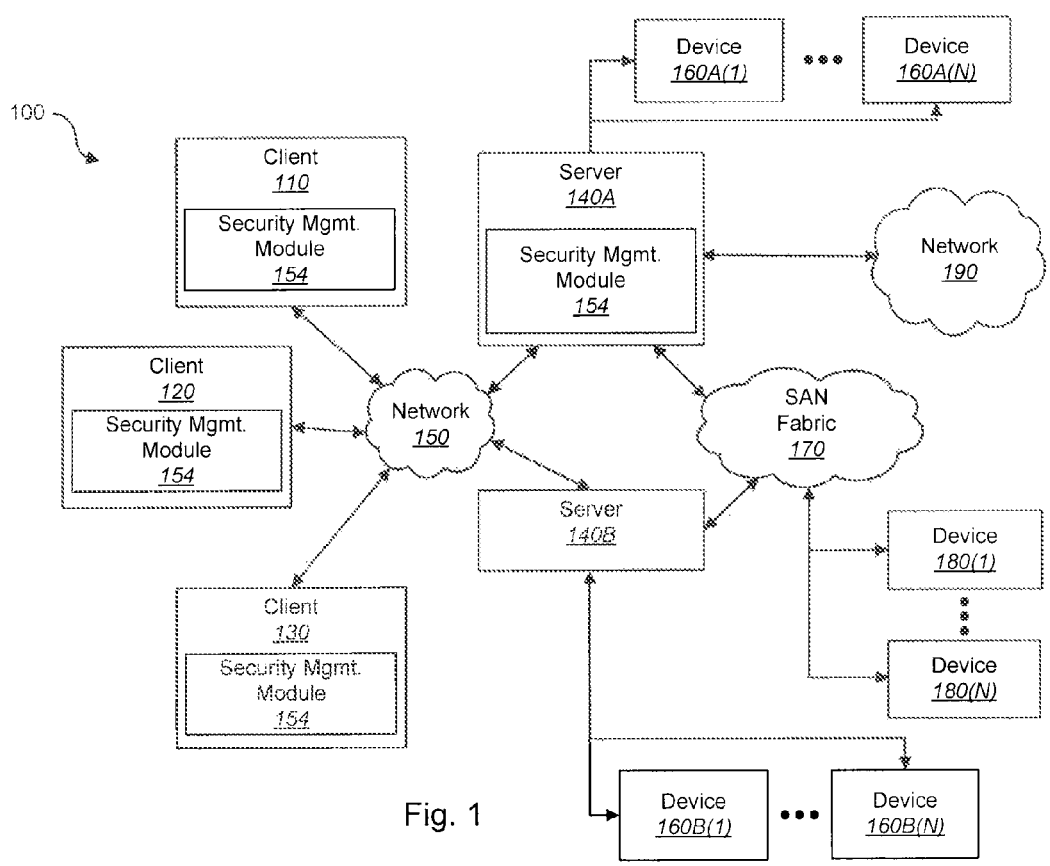
FIG. 1 shows a block diagram depicting a network architecture in accordance with an embodiment of the present disclosure.

FIG. 1 shows a block diagram depicting a network architecture for detecting anomalous network traffic in accordance with an embodiment of the present disclosure.

FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., authentication management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
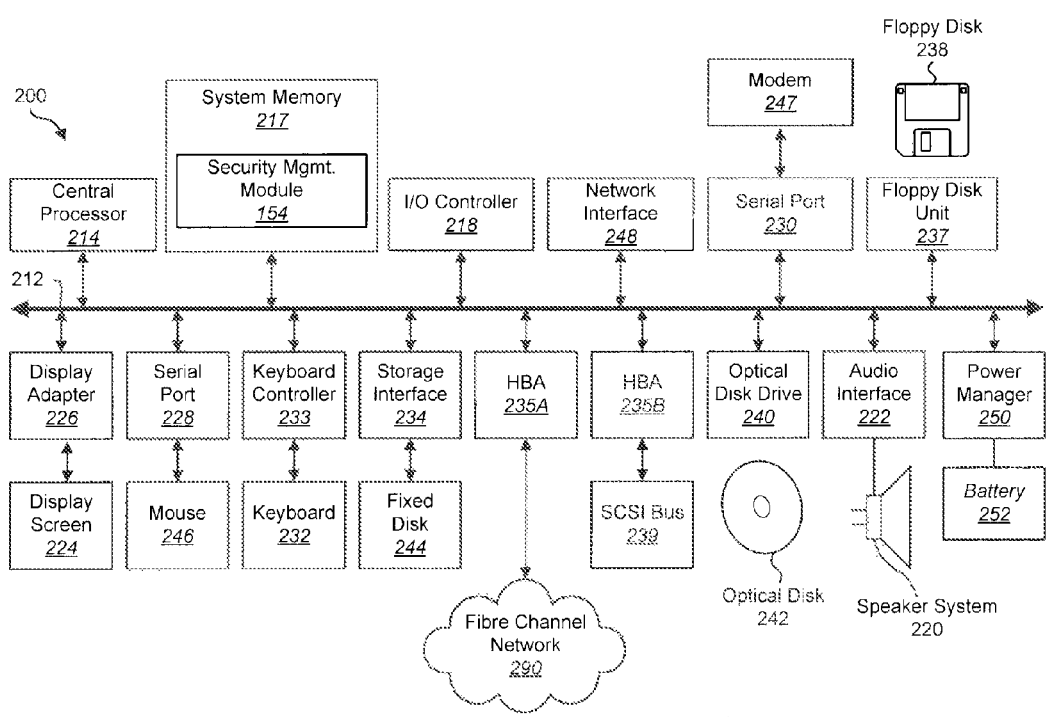
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, servers 140A and 140B may contain one or more portions of software for implementation of security management processes such as, for example security management module 154. Further, one or more portions of the security management module 154 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, detection of infected processes including security management module 154 may be implemented as part of a cloud computing environment.

Security management module 154 may monitor the use of network traffic by a variety of system processes. Security management module 154 may be implemented, for example, as a standalone utility or as part of a security application, and may monitor any network traffic originating with particular processes. The security management module 154 may be activated automatically as part of the initiation of particular applications or utilities. On some systems, the security management module 154 may represent a background process that monitors programs continually as part of required security protocols on the system. The security management module 154 may also be included as a browser plug-in or other component integrated with network-related software.

According to some embodiments, the security management module 154 may monitor all network traffic originating at a client system in order to identify any traffic that comes from a particular list of processes for which the security management module 154 is responsible for monitoring. The security management module 154 may compare any identified traffic from the listed processes against approved network traffic types in order to detect anomalous traffic. In some implementations, the security management module 154 may direct the system to block the anomalous traffic and may report the process that originated the traffic as an infected or potentially infected process.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, security management module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
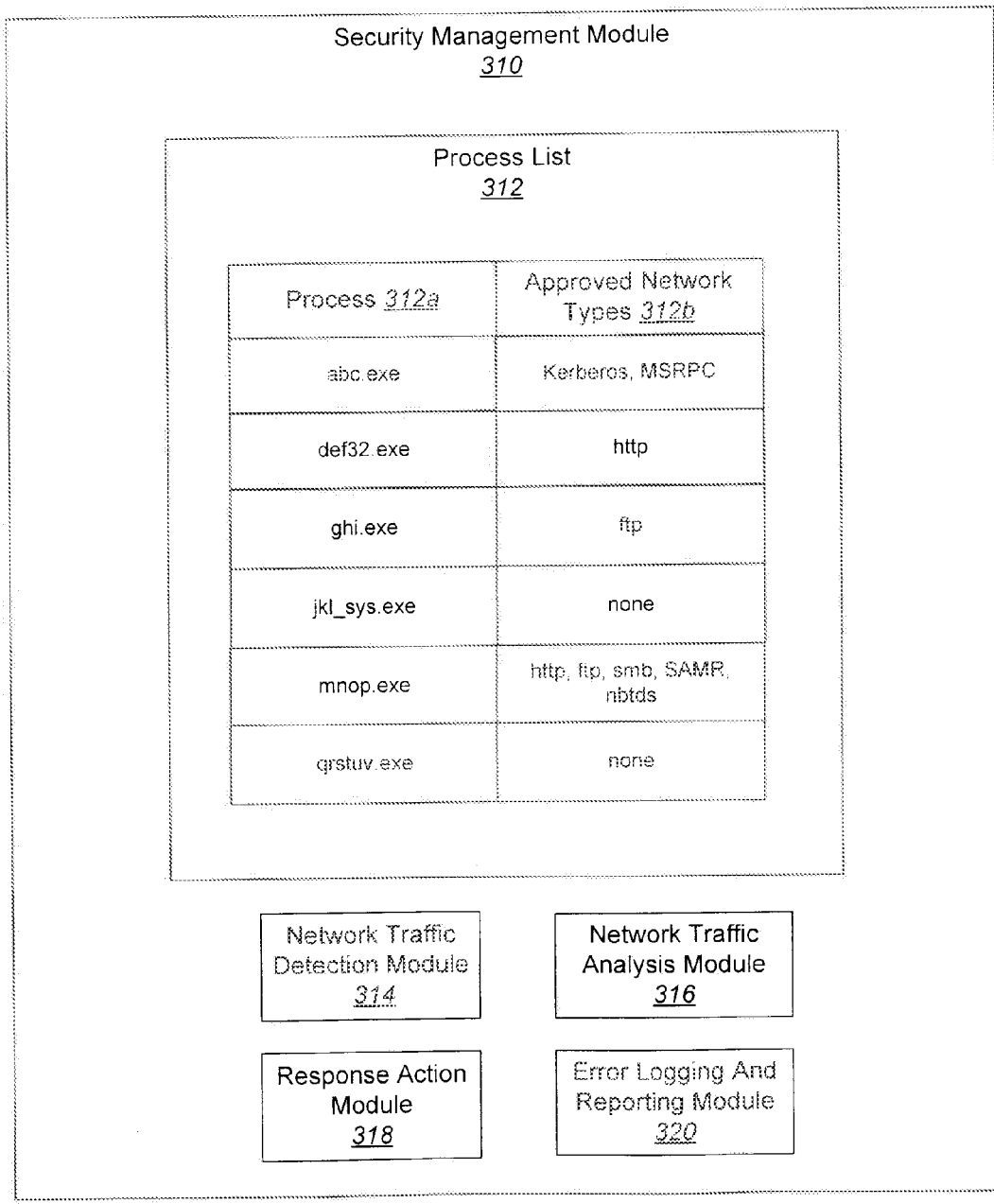
FIG. 3 shows an security management module in accordance with an embodiment of the present disclosure.

Referring to FIG. 3, there is shown a security management module 310 in accordance with an embodiment of the present disclosure. As illustrated, the security management module 310 may contain one or more components including a process list 312, network traffic detection module 314, network traffic analysis module 316, response action module 318, and error logging and reporting module 320.

The description below describes network elements, computers, and/or components of a system and method for improving security information that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). Any of the modules described herein may be associated with a network driver, gateway, proxy server, or other network element, computer or resource.

It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

A process list 312 may be a record representing a particular list of processes 312a for which network traffic is to be evaluated for security purposes. For each process, the process list 312 may include an associated list of approved types of network traffic 312b reflecting the types of network traffic that are transmitted by a properly functioning, uninfected copy of the process. In some implementations, the process list 312 may be generated by process analysis using aspects of a method 500 of dynamic analysis, a method 600 of static analysis, or a combination thereof. In some implementations, the process list 312 may be periodically updated through communication with an appropriate resource such as a proprietary server.

A network traffic detection module 314 may monitor network traffic in order to identify network traffic associated with each of the processes identified by the process list 312. In some implementations, the network traffic detection module 314 may be part of an intrusion detection and prevention system that monitors system network traffic in order to identify and respond to threats.

Each time that the network traffic detection module 314 identifies network traffic from one of the listed process, the network traffic analysis module 316 may determine the type of network traffic and match the type of network traffic to the list of approved types 312b for that particular process.

Should the network traffic analysis module 316 identify the network traffic as being of an unauthorized type, the response action module 318 may respond to the unauthorized traffic. In some implementations, the particular process may be identified as infected, and further action may be taken to eliminate or contain the infection. In some implementations, the unauthorized network traffic may be blocked from transmission, and further traffic from the process may be similarly blocked or at least screened.

Error logging and reporting module 320 may produce logs, reports, or other information associated with network traffic detection and system security. In some implementations, these logs may be used as input to a correlation system or security detection system for identifying new malware.

Figure 4:
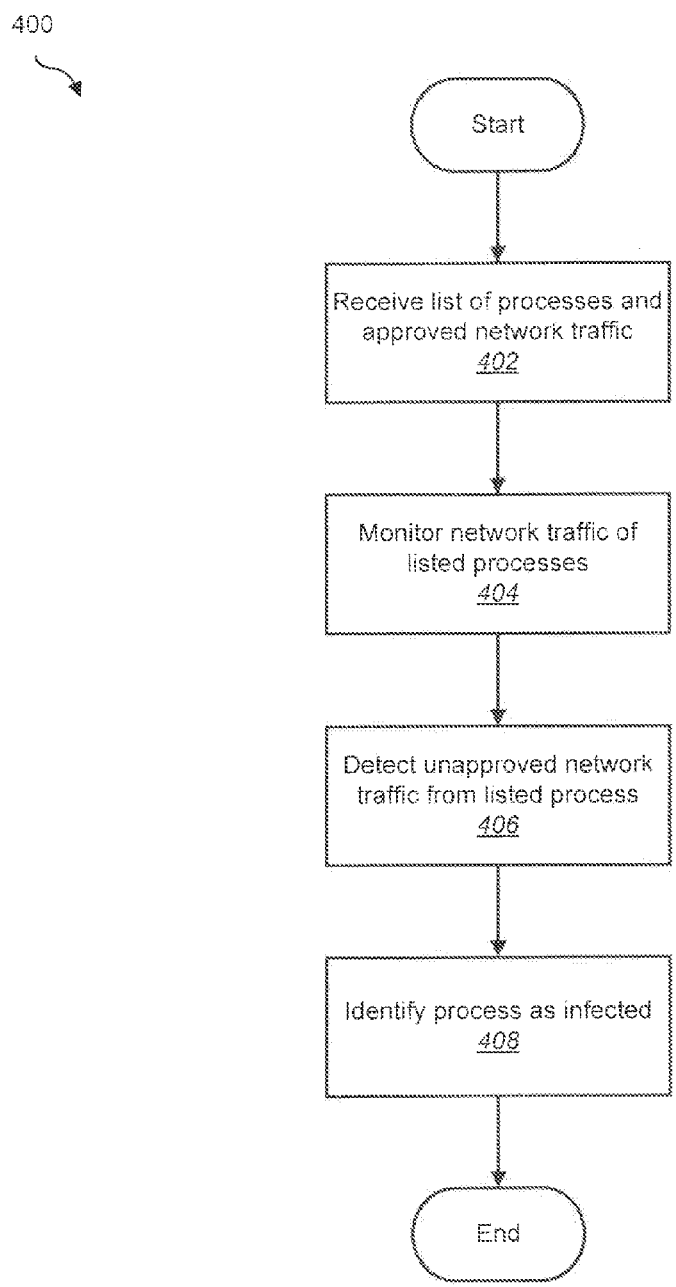
FIG. 4 shows a method for detecting anomalous network traffic in accordance with an embodiment of the present disclosure.

FIG. 4 shows a method 400 for detecting anomalous network traffic in accordance with an embodiment of the present disclosure.

At block 402, a list of processes is received that includes, for each of the processes, types of network traffic that are approved for that process. In some implementations, some of the processes may include multiple types of network traffic that are approved, while other network processes may include no approved types of network traffic (so that any network traffic detected will be identified as anomalous as further described below).

Types of network traffic may vary according to the features of the processes being monitored, and may depend on the capabilities of the module in classifying different types. In some implementations, network protocols may each be identified as a different type of network traffic. Protocols may include, for example, any or all of the following: FTP, HTTP, HTTPS, DNS, POP3, SMTP, SOCKS, IRC, HTTPS, YAHOO_MESSENGER, MSN_MESSENGER, LDAP, SMB, RPC, RDP, VNC, SNMP, SSH, MYSQL, MSSQL, QQ, EMULE, EDONKEY, and KERBEROS. Other free and proprietary protocols may also be in use. In some implementations, more than one network protocol may be classified as the same network traffic type. In some implementations, network traffic type may be classified other than by protocol.

At block 404, network traffic for the listed processes is monitored. In some implementations, the network traffic may be monitored by an intrusion prevention and detection system. In some implementations, each listed process may have a particular signature or subprocess specific for isolating and analyzing network traffic identified as originating with that process.

At block 406, unapproved network traffic is detected from a listed process. This may be determined by comparing each detected type of network traffic with the list of approved traffic types and identifying network traffic of a type not found on the list. Certain processes may not have any approved network traffic types, in which case any detected network traffic will be identified as unapproved.

At block 408, the process associated with the unapproved network traffic is identified as infected. In some implementations, this identification may be acted upon in a variety of ways, including quarantining the infected file, remediating or replacing the infected file, and blocking network traffic from the infected file until the file can be cleaned. Various security procedures and methods may be initiated to respond to an infected file and detected anomalous network traffic, including heightened monitoring, alerting a system user, and increased filtering of network traffic. Other reactions to identifying an infected file from anomalous network traffic are known in the art and may be carried out as appropriate.

Figure 5:
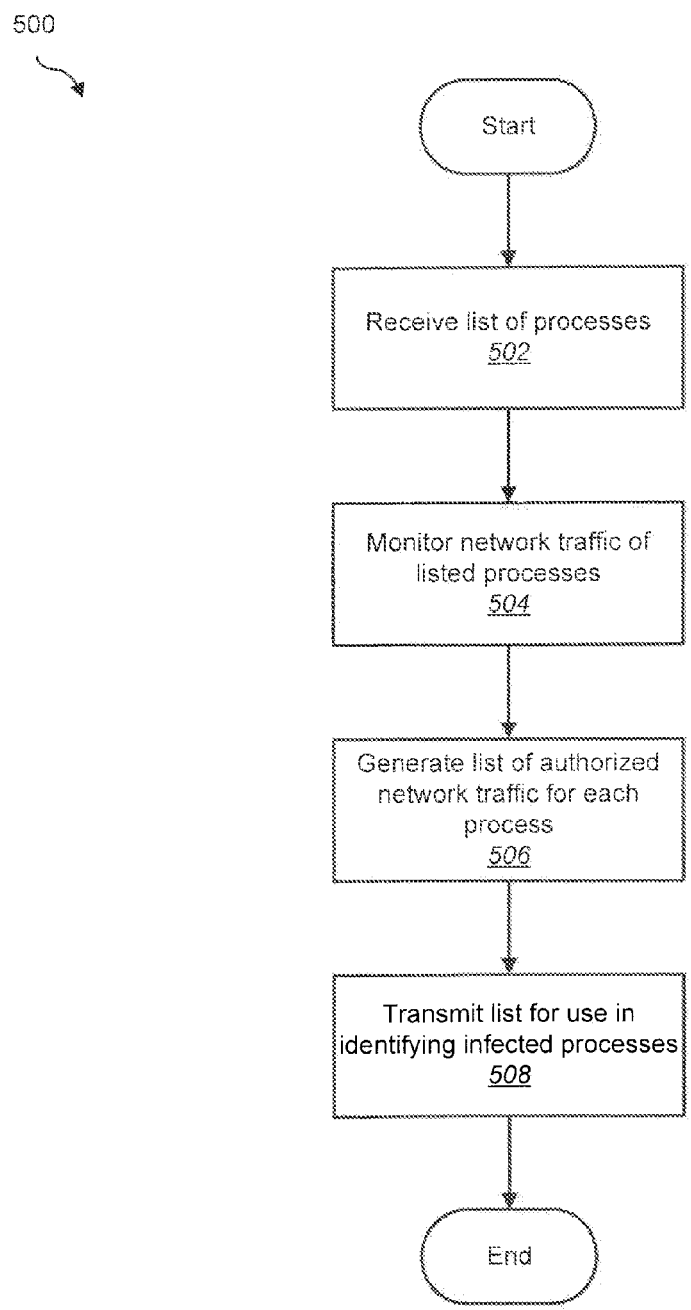
FIG. 5 shows a method of dynamic analysis of network traffic in accordance with an embodiment of the present disclosure.

FIG. 5 shows a method 500 for dynamic analysis of network traffic in accordance with an embodiment of the present disclosure. The purpose of the dynamic analysis is to generate a list of approved types of network traffic for each process by monitoring the types of network traffic used by "clean" copies of each process during normal operation of the process.

At block 502, a list of processes is received. In some implementations, one or more of the processes on the list may already include an associated list of approved network traffic. In other implementations, this process may represent the first or only opportunity for generating the list of approved network traffic for each of the processes.

At block 504, network traffic for the listed processes is monitored. In some implementations, the network traffic may be monitored by an intrusion prevention and detection system. In some implementations, each listed process may have a particular signature or subprocess specific for isolating and analyzing network traffic identified as originating with that process.

In some implementations, the monitoring of network traffic may be carried out on a set of "clean" processes that are known to not be infected by malicious code. If the dynamic analysis is carried out on "clean" processes, then any types of network traffic that are detected can be included in the generated list.

In some implementations, the monitoring may be carried out on a sample of different systems, some of which may include code infections. Because the sample may not be limited to "clean" systems, further analysis may be necessary in order to determine which of the detected network traffic types is consistent with the intended behavior of the process and which network traffic types may be indicative of malicious code.

At block 506, a list of approved network traffic is generated for each process and added to the list of processes received at block 502. The generated list may include all of the types of network traffic detected during the monitoring (such as if the monitoring is carried out only on known "clean" processes, for example), or may only include those types of network traffic detected during the monitoring that were used on a certain threshold percentage of processes (such as if the monitoring is carried out on a sample of different processes, some of which may be infected). The generated list may not only be limited to network traffic types detected during monitoring, but may also include types of traffic previously included on a list of approved network traffic types for the particular process. Network traffic types identified through another process, such as static analysis, may also be included on the list.

The list of processes, including lists of approved network traffic types for each process, may then be transmitted for use in identifying infected processes at block 508. In some implementations, the list of processes generated and transmitted may be used according to method 400 for monitoring and detecting anomalous network traffic, or similar, as described herein.

Figure 6:
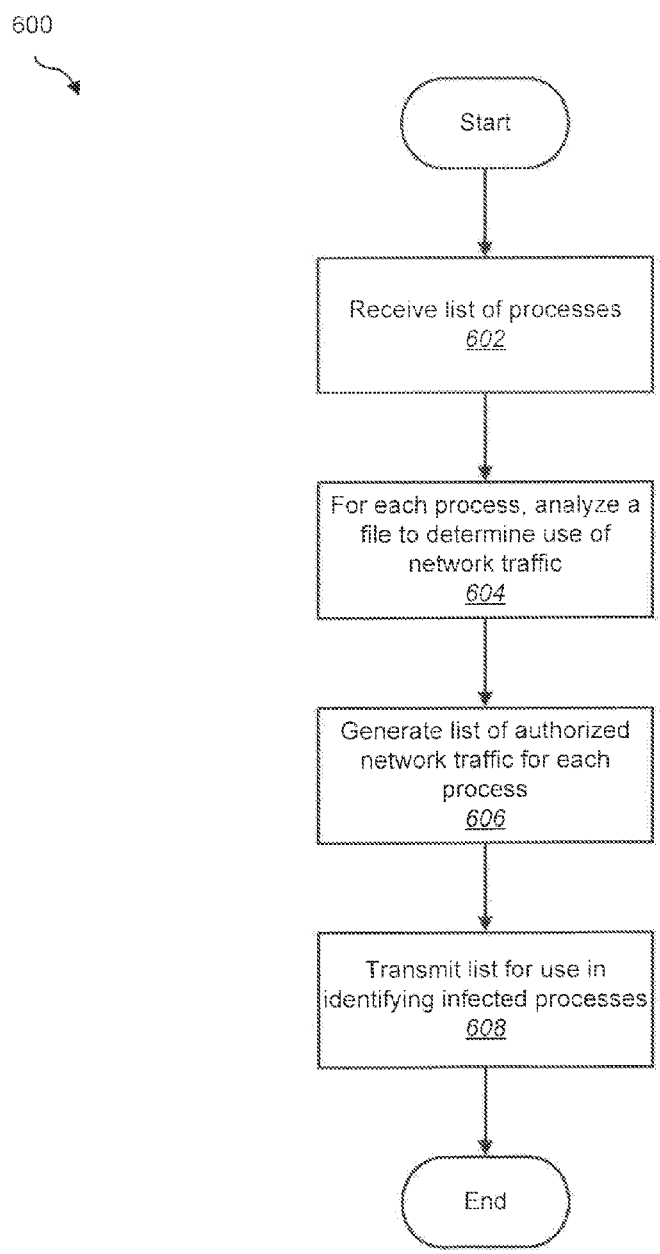
FIG. 6 shows a method of static analysis of particular processes in accordance with an embodiment of the present disclosure.

FIG. 6 shows a method 600 for static analysis of particular processes in accordance with an embodiment of the present disclosure. The purpose of the static analysis is to generate a list of approved types of network traffic for each process by analyzing files associated with each process to determine which types of network traffic are included in libraries and functions called by that process.

At block 602, a list of processes is received. In some implementations, one or more of the processes on the list may already include an associated list of approved network traffic. In other implementations, this process may represent the first or only opportunity for generating the list of approved network traffic for each of the processes.

At block 604, files associated with each of the listed process are analyzed. The file analysis may include any number of procedures, and may particularly involve information provided by the file to the system indicative of what types of network traffic the process associated with that file is expected to generate.

In some implementations, the static analysis may be carried out by identifying which system libraries the process includes, and which functions are called from those libraries. For example, many operating systems contain a number of common libraries that are accessed by system files for such functions as network communication, and only a specific subset of those libraries include functions that the process can use to generate network traffic. In some implementations, the system may first distinguish those listed processes that include at least one of the identified libraries with networking functions from those listed processes that do not include any of the libraries with networking functions. Each process that does not include any such library may be designated as not having network traffic. Then, for each process that does include at least one such library, a further analysis may be made of which functions are called by the process. Expected types of traffic may be associated with each process based on the types of network traffic generated by the functions called by that process.

In some implementations, particular information received during static analysis may complicate the analysis. If a process includes an open-ended capability to load any library (such as with a "load library" or equivalent command), then it may not be possible to delineate through static analysis what the process is capable of. In some implementations, the system may flag such processes as not eligible for static analysis. In other implementations, common libraries that are loaded by such processes may themselves be subject to static analysis, in which case the behavior of the process will be circumscribed only for process instances that include that particular library. Other security measures may be taken to monitor and protect such processes.

At block 606, a list of approved network traffic is generated for each process and added to the list of processes received at block 602. The generated list may include all of the types of network traffic identified during the analysis. The generated list may not only be limited to network traffic types detected during monitoring, but may also include types previously included on a list of approved network traffic types for the particular process. Network traffic types identified through another process, such as dynamic analysis, may also be included on the list.

The list of processes, including lists of approved network traffic types for each process, may then be transmitted for use in identifying infected processes at block 608. In some implementations, the list of processes generated and transmitted may be used according to method 400 for monitoring and detecting anomalous network traffic, or similar, as described herein.

At this point it should be noted that security management techniques in accordance with the present disclosure as described above may involve the processing of input data and the generation of output data to some extent. This input data processing and output data generation may be implemented in hardware or software. For example, specific electronic components may be employed in a file remediation repository or similar or related circuitry for implementing the functions associated with file remediation in accordance with the present disclosure as described above. Alternatively, one or more processors operating in accordance with instructions may implement the functions associated with file remediation in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing authentication information comprising:
receiving a list including a plurality of processes, wherein each of the plurality of processes is run on a client system by executing a file representing that process;
for each process on the list, analyzing the file representing that process to determine what types of network traffic are used by the process by identifying in the file instructions that entail those types of network traffic;
for each process on the list, generating a list of approved types of network traffic based on types of network traffic determined for the process while analyzing the file representing the process;
transmitting the list of processes including, for each process, the list of approved types of network traffic for use in identifying infected processes;
monitoring network traffic of each process on the list of processes;
upon detecting network traffic for a process on the list of processes, determining that the type of network traffic detected is not on the list of approved types for that process; and
identifying the process as infected based on determining that the type of network traffic detected is not on the list of approved types for that process.

2. The method of claim 1, wherein for each process on the list, analyzing the file comprises identifying any libraries referenced in the file for inclusion by the process that include functions facilitating the generation of network traffic.

3. The method of claim 2, wherein for at least one process on the list, analyzing the file further comprises identifying one or more functions referenced in the file for function call by the process that facilitate the generation of network traffic.

4. The method of claim 3, wherein for the at least one process on the list, generating the list of approved types of network traffic comprises identifying those types of network traffic facilitated by the identified functions.

5. At least one non-transitory processor readable storage medium storing a computer program of instructions configured to be readable by at least one processor for instructing the at least one processor to execute a computer process including the steps of:
receiving a list including a plurality of processes, wherein each of the plurality of processes is run on a client system by executing a file representing that process;
for each process on the list, analyzing the file representing that process to determine what types of network traffic are used by the process by identifying in the file instructions that entail those types of network traffic;
for each process on the list, generating a list of approved types of network traffic based on types of network traffic determined for the process while analyzing the file representing the process;
transmitting the list of processes including, for each process, the list of approved types of network traffic for use in identifying infected processes;
monitoring network traffic of each process on the list of processes;
upon detecting network traffic for a process on the list of processes, determining that the type of network traffic detected is not on the list of approved types for that process; and
identifying the process as infected based on determining that the type of network traffic detected is not on the list of approved types for that process.

6. The at least one non-transitory processor readable storage medium of claim 5, wherein for each process on the list, analyzing the file comprises identifying any libraries referenced in the file for inclusion by the process that include functions facilitating the generation of network traffic.

7. The at least one non-transitory processor readable storage medium of claim 6, wherein for at least one process on the list, analyzing the file further comprises identifying one or more functions referenced in the file for function call by the process that facilitate the generation of network traffic.

8. The at least one non-transitory processor readable storage medium of claim 7, wherein for the at least one process on the list, generating the list of approved types of network traffic comprises identifying those types of network traffic facilitated by the identified functions.

9. A system for managing authentication information, the system comprising:
at least one memory for storing computer executable instructions;

at least one hardware processor coupled to the at least one memory, the at least one hardware processor configured to execute the computer executable instructions which are configured to cause the at least one hardware processor to:
- receive a list including a plurality of processes, wherein each of the plurality of processes is run on a client system by executing a file representing that process;
- for each process on the list, analyze the file representing that process to determine what types of network traffic are used by the process by identifying in the file instructions that entail those types of network traffic;
- for each process on the list, generate a list of approved types of network traffic based on types of network traffic determined for the process while analyzing the file representing the process;
- transmit the list of processes including, for each process, the list of approved types of network traffic for use in identifying infected processes;
- monitor network traffic of each process on the list of processes;
- upon detecting network traffic for a process on the list of processes, determine that the type of network traffic detected is not on the list of approved types for that process; and
- identify the process as infected based on determining that the type of network traffic detected is not on the list of approved types for that process.

10. The system of claim 9, wherein for each process on the list, analyzing the file comprises identifying any libraries referenced in the file for inclusion by the process that include functions facilitating the generation of network traffic.

11. The system of claim 10, wherein for at least one process on the list, analyzing the file further comprises identifying one or more functions referenced in the file for function call by the process that facilitate the generation of network traffic.

12. The system of claim 11, wherein for the at least one process on the list, generating the list of approved types of network traffic comprises identifying those types of network traffic facilitated by the identified functions.

\* \* \* \* \*